United States Patent [19]

Maeda et al.

[11] Patent Number: 5,615,479
[45] Date of Patent: Apr. 1, 1997

[54] METHOD OF MANUFACTURING A SPHERICAL ANNULAR SEAL

[75] Inventors: Takashi Maeda, Fujisawa; Takeshi Furukido, Yamato; Kousaku Hoshino, Fujisawa; Satoru Udo, Nakatsu; Masayoshi Izumi, Chikujo, all of Japan

[73] Assignee: Oiles Corporation, Japan

[21] Appl. No.: 457,318

[22] Filed: Jun. 1, 1995

Related U.S. Application Data

[62] Division of Ser. No. 130,898, Oct. 4, 1993.

[30] Foreign Application Priority Data

Oct. 12, 1992 [JP] Japan .................................. 4-300550

[51] Int. Cl.$^6$ ...................................................... B23P 15/00
[52] U.S. Cl. ............................. 29/888.3; 29/505; 277/100
[58] Field of Search .............................. 29/888.3, 428, 29/505; 277/30, 100, 207 A, 235 R, 235 A, DIG. 6; 285/261, 266, 267, 268, 910

[56] References Cited

U.S. PATENT DOCUMENTS

| | | |
|---|---|---|
| 4,601,476 | 7/1986 | Usher et al. . |
| 4,659,091 | 4/1987 | Baasner et al. .................. 277/227 X |
| 4,762,330 | 8/1988 | Lönne et al. . |
| 4,871,181 | 10/1989 | Usher et al. ........................ 285/268 X |
| 5,040,805 | 8/1991 | Ozora ................................ 277/235 A |

FOREIGN PATENT DOCUMENTS

| | | |
|---|---|---|
| 58-34230 | 2/1983 | Japan . |
| 299393 | 12/1989 | Japan . |
| 2-215916 | 8/1990 | Japan . |

*Primary Examiner*—Irene Cuda
*Attorney, Agent, or Firm*—Nixon & Vanderhye

[57] ABSTRACT

A spherical annular seal having a through hole in a center thereof and a partially convex spherical surface portion on an outer surface thereof, wherein an inner peripheral surface of the spherical annular seal defining the through hole is reinforced by a reinforcing member formed of a metal mesh, and a uniform lubricating sliding layer of a lubricating composition containing 70 to 90 wt. % of boron nitride and 10 to 30 wt. % of alumina is formed on a surface of the partially convex spherical surface portion.

8 Claims, 9 Drawing Sheets

METHOD OF MANUFACTURING A SPHERICAL ANNULAR SEAL

This is a divisional of application Ser. No. 08/130,898, filed Oct. 4, 1993.

BACKGROUND OF THE INVENTION

The present invention relates to a spherical annular seal used in a spherical pipe joint for an automobile exhaust pipe and a method of manufacturing the same.

Conventionally, a spherical annular seal for use in a spherical pipe joint for an automobile exhaust pipe, in which a mixture of relatively short fibers (2 to 8 mm) and a solid lubricant such as graphite is compression-formed, is known, as disclosed in, for instance, U.S. Pat. No. 4,659,091 (hereafter referred to as the prior art publication 1).

Although the seal disclosed in this prior art publication 1 has the advantage that it can be manufactured easily at low cost, the seal has a drawback in that stick slip often generating abnormal noise can be induced in friction with a mating member. Also, the seal has a problem in that, owing to problems with materials constituting the seal and with a method of manufacturing the seal, the strength of the seal comes to decline over periods of use, possibly resulting in partial fracture or breakage of thee seal and thereby lowering the function of the seal.

The seal in accordance with the prior art publication 1 has a spherical annular shape, and is provided with a through hole in its center and a partially convex spherical surface portion on its outer side. Therefore, particularly at the time of manufacturing the seal, portions filled coarsely with material and other portions filled densely with material can occur in a small-diameter portion (a tip portion of the seal) of the partially convex spherical surface portion of the seal. In that case, pressure cannot be applied sufficiently to the coarsely filled portions during subsequent compression forming, so that an insufficient-strength portion may occur in that portion. The insufficient-strength portion possibly leads to fracture or breakage of that portion during the use of the seal, causing leakage of exhaust gases.

Accordingly, in view of the problem of a decline in the strength of the seal in accordance with the above-described prior art publication 1 and the problem of occurrence of abnormal noise during an initial period of friction with the mating member, a seal disclosed in Japanese Patent Unexamined Publication No. 215916/1990 (hereafter referred to as the prior art publication 2) has been proposed.

Namely, the seal proposed in the prior art publication 2 is arranged such that a mixture including a solid lubricant, such as graphite, metal fibers 10 to 200 μm in diameter and 100–800μm in length, and a resin binder is so compressed together with a tubular reinforcing member formed of a metal mesh that the mixture is filled in mesh openings of the tubular reinforcing member and surrounds the reinforcing member, a through hole with the reinforcing member exposed being formed in its center and a partially convex spherical surface portion being formed on its outer surface, wherein a lubricating sliding layer including tetrafluoroethylene or a lubricating composition having tetrafluoroethylene as a main component is formed on the partially convex spherical surface portion of the seal.

In accordance with the prior art publication 2, it is possible to obtain a seal having enhanced strength without causing insufficiency in strength attributable to the coarse and dense filling of the material in the small-diameter portion of the partially convex spherical surface portion, which is the drawback of the above-described prior art publication 1. In addition, since the lubricating sliding layer is formed on the surface of the partially convex spherical surface portion which is a frictional surface in friction with a mating member, the drawback of the occurrence of abnormal noise particularly during an initial period of friction is not experienced. Thus, the problems of the seal in accordance with the prior art publication 1 are overcome.

It is true that the seal in accordance with the above-described prior art publication 2 overcomes the drawbacks of the seal disclosed in the prior art publication 1 according to the test conditions and test method disclosed in the publication 2. However, in a case where the seal is used under test conditions and a test method which are severer than those of the aforementioned test conditions and test method, there arises a new problem of an exfoliation or peeling taking place in the lubricating sliding layer formed on the partially convex spherical surface portion on its outer surface, resulting in the occurrence of abnormal noise.

In particular, as for the spherical pipe joint used for the purpose of attenuating vibrations transmitted from the automobile engine to the exhaust pipe, the position of its installation in the exhaust pipe extending from the engine to the muffler is determined by taking various conditions into consideration. Accordingly, the seal which is incorporated in such a joint is required to be capable of coping with all the conditions.

SUMMARY OF THE INVENTION

The present invention has been accomplished in view of the above-described problems, and an object of the present invention is to provide a spherical annular seal in which a decline in a sliding characteristic and the occurrence of abnormal noise are prevented not only during an initial period but over long periods of use without causing an exfoliation in a lubricating sliding layer formed on a partially convex spherical surface portion on its outer surface, as well as a method of manufacturing the same.

In accordance with one aspect of the present invention, the above-object is attained by a spherical annular seal particularly used for an exhaust pipe joint, the spherical annular seal being formed by compression forming a mixture of a solid lubricant, metal short fibers, and a synthetic resin binder, the spherical annular seal having a through hole in a center thereof and a partially convex spherical surface portion on an outer surface thereof, wherein an inner peripheral surface of the spherical annular seal defining the through hole is reinforced by a reinforcing member formed of a metal mesh, and a uniform lubricating sliding layer of a lubricating composition containing 70 to 90 wt. % of boron nitride and 10 to 30 wt. % of alumina and/or silica, or a lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, is formed on a surface of the partially convex spherical surface portion.

In accordance with another aspect of the present invention, the above-object is attained by a spherical annular seal particularly used for an exhaust pipe joint, the spherical annular seal being formed by compression forming a mixture of a solid lubricant, metal short fibers, and a synthetic resin binder, the spherical annular seal having a through hole in a center thereof and a partially convex spherical surface portion on an outer surface thereof, wherein an inner peripheral surface of the spherical annular seal defining the through hole is reinforced by a reinforcing member formed of a metal mesh, and a surface of the partially convex spherical surface portion is formed into a smooth surface in which a uniform lubricating sliding layer of a lubricating composition containing 70 to 90 wt. % of boron nitride and 10 to 30 wt. % of alumina and/or silica, or a lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and a reinforcing member formed of a metal mesh covering the lubricating sliding layer and integrated with the lubricating sliding layer, are present in mixed form.

In accordance with still another aspect of the present invention, the above-object is attained by a spherical annular seal particularly used for an exhaust pipe joint, the spherical annular seal being formed by compression forming a mixture of a solid lubricant, metal short fibers, and a synthetic resin binder, the spherical annular seal having a through hole in a center thereof and a partially convex spherical surface portion on an outer surface thereof, wherein an inner peripheral surface of the spherical annular seal defining the through hole is reinforced by a reinforcing member formed of a metal mesh, and a surface of the partially convex spherical surface portion is formed into a smooth surface including a uniform lubricating sliding layer of a lubricating composition containing 70 to 90 wt. % of boron nitride and 10 to 30 wt. % of alumina and/or silica, or a lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and also including a reinforcing member extending integrally from the reinforcing member for reinforcing the inner peripheral surface of the spherical annular seal, and integrated with and covering a small-diameter end of the partially convex spherical surface portion and mixed in and integrated with the lubricating sliding layer on the partially convex spherical surface portion.

In accordance with a further aspect of the present invention, the above-object is attained by a method of manufacturing a spherical annular seal, comprising the steps of: fitting a tubular reinforcing member formed of a metal mesh over an outer peripheral surface of a core of a die having a generally cylindrical hollow portion in its interior; forming a preform having the tubular reinforcing member on its inner surface by filling a mixture of a solid lubricant, metal short fibers, and a synthetic resin binder into the generally cylindrical hollow portion of the die in such a manner as to fill mesh openings of the tubular reinforcing member and cover the tubular reinforcing member, and by compression forming the mixture and the reinforcing member in a direction of a core axis; forming a coating layer constituted by a lubricating composition by coating an outer peripheral surface of the preform with an aqueous dispersion containing as a solid content 20 to 50 wt. % of the lubricating composition containing 70 to 90 wt. % of boron nitride and 10 to 30 wt. % of alumina and/or silica, or a lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and by drying the aqueous dispersion; preparing a die having a partially concave spherical surface portion on its inner surface, and fitting the preform with the coating layer of the lubricating composition formed thereon over an outer peripheral surface of the core of the die; compressing the preform in a direction of a core axis for obtaining a spherical annular member which has in its center a through hole with its inner peripheral surface reinforced by the compressed tubular reinforcing member, as well as a partially convex spherical surface portion on its outer surface, a uniform lubricating sliding layer of the lubricating composition containing 70 to 90 wt. % of boron nitride and 10 to 30 wt. % of alumina and/or silica, or the lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, being formed on a surface of the partially convex spherical surface portion; and placing the spherical annular member in a heating furnace to heat and cure the synthetic resin binder in the mixture.

In accordance with a still further aspect of the present invention, the above-object is attained by a method of manufacturing a spherical annular seal, comprising the steps of: fitting a tubular reinforcing member formed of a metal mesh over an outer peripheral surface of a core of a die having a generally cylindrical hollow portion in its interior; forming a preform having the tubular reinforcing member on its inner surface by filling a mixture of a solid lubricant, metal short fibers, and a synthetic resin binder into the generally cylindrical hollow portion of the die in such a manner as to fill mesh openings of the tubular reinforcing member and cover the tubular reinforcing member, and by compression forming the mixture and the reinforcing member in a direction of a core axis; forming a coating layer constituted by a lubricating composition by coating an outer peripheral surface of the preform with an aqueous dispersion containing as a solid content 20 to 50 wt. % of the lubricating composition containing 70 to 90 wt. % of boron nitride and 10 to 30 wt. % of alumina and/or silica, or a lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and by drying the aqueous dispersion; preparing a die having a partially concave spherical surface portion on its inner surface, and fitting the preform with the coating layer of the lubricating composition formed thereon over an outer peripheral surface of the core of the die, and fitting a tubular reinforcing member formed of a metal mesh over an outer peripheral surface of the preform; compressing the preform and the tubular reinforcing member in a direction of a core axis for obtaining a spherical annular member which has in its center a through hole with its inner peripheral surface reinforced by the compressed tubular reinforcing member, as well as a partially convex spherical surface portion on its outer surface, a surface of the partially convex spherical surface portion being formed into a smooth surface in which a lubricating sliding layer of the lubricating composition containing 70 to 90 wt. % of boron nitride and 10 to 30 wt. % of alumina and/or silica, or the lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and the reinforcing member formed of the metal mesh covering the lubricating sliding layer and integrated with the lubricating sliding layer are present in mixed form; and placing the spherical annular member in a heating furnace to heat and cure the synthetic resin binder in the mixture.

In accordance with a still further aspect of the present invention, the above-object is attained by a method of manufacturing a spherical annular seal, comprising the steps of: preparing a die having a generally cylindrical hollow portion in its interior, filling the hollow portion with a mixture of a solid lubricant, metal short fibers, and a synthetic resin binder, and compression forming the mixture in a direction of a core axis so as to form a preform; forming a coating layer constituted by a lubricating composition by coating an outer peripheral surface of the preform with an aqueous dispersion containing as a solid content 20 to 50 wt. % of the lubricating composition containing 70 to 90 wt. % of boron nitride and 10 to 30 wt. % of alumina and/or silica, or a lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and by drying the aqueous dispersion; preparing a reinforcing member formed of a metal mesh having an inner tubular portion, a curved portion continuing from the inner tubular portion, and an outer tubular portion continuing from the curved portion; inserting the preform with the coating layer of the lubricating composition formed thereon between the inner and outer tubular portions of the reinforcing member formed of the metal mesh, and fitting an assembly of the preform and the reinforcing member over an outer peripheral surface of the core of a die having a partially concave spherical surface portion on its inner surface so as to be located on the partially concave spherical surface portion of the die; compression forming the assembly of the preform and the reinforcing member in a direction of a core axis, for obtaining a spherical annular member which has in its center a through hole with its inner peripheral surface reinforced by the compressed tubular reinforcing member, as well as a partially convex spherical surface portion on its outer surface, a surface of the partially convex spherical surface portion being formed into a smooth surface in which a lubricating sliding layer of the lubricating composition containing 70 to 90 wt. % of boron nitride and 10 to 30 wt. % of alumina and/or silica, or the lubricating composition containing 100 parts by weight of the lubricating composition containing 70 to 90 wt. % of boron nitride and 10 to 30 wt. % of alumina and/or silica and further containing polytetrafluoroethylene in a proportion of 200 parts by weight or less, preferably ranging from 50 to 150 parts by weight, and the reinforcing member extending from the through hole and integrated with and covering a small-diameter end of the partially convex spherical surface portion and the lubricating sliding layer on the partially convex spherical surface portion are present in mixed form; and placing the spherical annular member in a heating furnace to heat and cure the synthetic resin binder in the mixture.

In the spherical annular seal in accordance with the present invention, a uniform lubricating sliding layer of a lubricating composition containing boron nitride and alumina and/or silica, or a lubricating composition containing boron nitride, alumina and/or silica, and polytetrafluoroethylene, is formed on the surface of the partially convex spherical surface portion forming a frictional surface with respect to a mating member. Accordingly, when the spherical annular seal undergoes friction with respect to the mating member, relative angular movement of upstream- and downstream-side exhaust pipes is permitted at low frictional torque without being affected by the conditions of use of the seal, and abnormal noise is prevented from occurring.

The exfoliation or peeling of the lubricating sliding layer from the partially convex spherical surface portion does not occur since the retention of the lubricating sliding layer on the partially convex spherical surface portion of the seal is enhanced by alumina and/or silica which is compounded with boron nitride at a fixed ratio, and since the adhesion of the lubricating sliding layer formed of the lubricating composition containing polytetrafluoroethylene is enhanced by polytetrafluoroethylene.

Furthermore, in the seal in which the partially convex spherical surface portion of the seal comprises the lubricating sliding layer and the reinforcing member formed of a metal mesh integrated with the sliding layer, since the sliding layer is reinforced by the reinforcing member, the aforementioned advantages appear more noticeably.

In the method of manufacturing a spherical annular seal in which the lubricating sliding layer and the reinforcing member formed of the metal mesh are integrated in mixed form, by using the reinforcing member having an inner tubular portion, a curved portion continuing from the inner tubular portion, and an outer tubular portion continuing from the curved portion, advantages are offered in that the manufacturing process is simplified, and that the small-diameter end of the partially convex spherical surface portion of the spherical annular seal can be reinforced.

Hereafter, a detailed description of the present invention will be given of an embodiment of the spherical annular seal, specific examples of component materials of the spherical annular seal and a method of manufacturing the seal with reference to the accompanying drawings. It should be noted that the present invention is not restricted to these specific examples.

Figure 1:
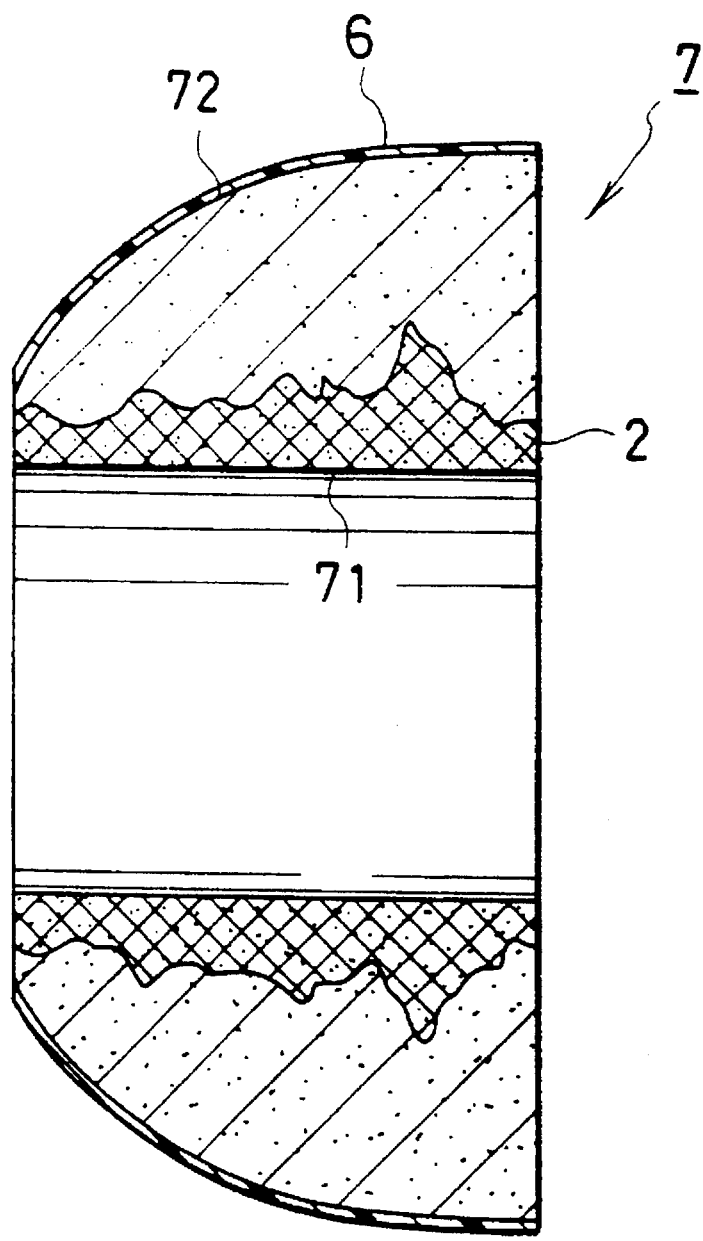
FIG. 1 is a vertical cross-sectional view of an example of a spherical annular seal in accordance with the present invention.

DESCRIPTION OF THE PREFERRED EMBODIMENT (Mixture)
(A) Metal Short Fibers

As metal short fibers, those obtained by cutting wool-like fibers formed by shaving iron or an iron alloy, such as steel and stainless steel, copper or a copper alloy, such as bronze, phosphur bronze, lead bronze, brass, and aluminum bronze, or by chipping raw wires formed of such materials.

In particular, short fibers having a diameter of 10 to 200 µm and a length of 100 to 800 m are preferable since they permit a reinforcing member and a mixture to be integrated firmly for the following reasons: These short fibers form a uniform mixture; they can be filled uniformly in a die during the manufacture of the seal; they can be filled into mesh openings of the reinforcing member formed of a metal mesh which will be described later; and the fibers can be intertwined with each other. As for the metal short fibers, iron-based or copper-based fibers can be used singly or in the form of a mixture thereof.

(B) Solid Lubricant

As a solid lubricant, powder of graphite, molybdenum disulfide or the like is used singly or in the form of a mixture thereof.

(C) Synthetic Resin Binder

As a synthetic resin binder, a phenol resin, a polyimide resin or the like is used.

The aforementioned metal short fibers, solid lubricant, and synthetic resin binder are charged into a mixer, and are stirred and mixed so as to be formed into a uniform mixture. As compounding proportions of this mixture 50 to 75 wt. % of the metal short fibers, 15 to 30 wt. % of the solid lubricant, and 5 to 25 wt. % of the synthetic resin binder are preferable ranges of composition.

(Reinforcing Member)

As the reinforcing member, a metal mesh (wire net) formed by weaving or knitting fine wires of stainless steel or iron is used. In terms of the form of the reinforcing member, it is possible to use, for instance, the following: (1) a tubular reinforcing member formed by convoluting a metal mesh, formed by weaving or knitting fine metal wires into a belt shape, by at least one turn into a tubular shape, and then by securing an overlapping portion by means of spot welding or a clasp; (2) an annular reinforcing member in which the tubular reinforcing member is compressed in the axial direction of the cylinder; (3) a tubular reinforcing member constituted by a tubular woven metal mesh or in which such tubular woven metal meshes are fitted one over another; (4) a reinforcing member comprised of an inner tubular portion, a turned-back curved portion continuing from the inner tubular portion, and an outer tubular portion continuing from the curved portion, which are formed by turning back one end of a tubular woven metal mesh toward the other; and (5) a reinforcing member comprised of an inner tubular portion, a turned-back curved portion continuing from the inner tubular portion, and an outer tubular portion continuing from the curved portion, which are formed such that a metal mesh, formed by weaving or knitting fine metal wires into a belt shape, is cut into a rectangular shape, this material is folded in two, and is then convoluted into a tubular shape, and opposite ends are superposed one on top of the other and are temporarily fixed.

As the wire diameter of the fine metal wire forming the metal wire net, a fine metal wire having a diameter of 0.10 to 0.31 mm or thereabouts is used, and a metal wire net whose mesh openings are 3 to 6 mm or thereabouts is suitably used.

(Preform)

The preform is formed by filling a die having a hollow cylindrical portion with a mixture of the above-described composition, and by subjecting this mixture to compression forming in the axial direction of the hollow cylindrical portion. In terms of its configuration, this preform has dimensional such relationships that its inside diameter is larger than the inside diameter of the spherical annular seal, i.e., a final product, its outside diameter is smaller than the outside diameter of the seal, and its height is larger than the height of the seal. If the operating efficiency is taken into consideration, a cylindrically shaped member whose outer peripheral surface at one end portion thereof is tapered toward the end is preferable.

This preform may be fabricated as one which is provided with a reinforcing member on its inner peripheral surface, by placing the above-described tubular reinforcing member on its inner peripheral surface in advance, filling the mixture in such a manner as to cover the reinforcing member, and then by performing compression forming.

Then, this preform is formed by subjecting the mixture in the hollow cylindrical portion of the die to compression forming under a pressure of 0.1 to 0.8 ton/cm$^2$.

(Lubricating Composition)

As a lubricating composition, an aqueous dispersion containing as a solid content 20 to 50 wt. % of a lubricating composition containing 70 to 90 wt. % of boron nitride and 10 to 30 wt. % of alumina and/or silica is used. An alternative lubricating composition may be an aqueous dispersion which contains as a solid content 20 to 50 wt. % of a lubricating composition in which a lubricating composition containing 70 to 90 wt. % of boron nitride and 10 to 30 wt. % of alumina and/or silica is set as 100 parts by weight, and which additionally contains polytetrafluoro-ethylene in the proportion of 200 parts by weight or less, preferably 50 to 150 parts by weight.

The above-described aqueous dispersion of the lubricating composition is coated on the outer peripheral surface of the above-described preform by means of brushing, spraying, or the like in the manufacturing method which will be described later. In a final compression process, the coating is spread into a uniform and very small thickness (10 to 300 µm) on the surface of a partially convex spherical portion of a spherical annular seal so as to form a lubricating sliding layer.

In coating, in a case where the solid content in the aqueous dispersion is 20 to 30 wt. % (water content of 70 to 80 wt. %), a lubricating sliding layer of a desired thickness can be formed by repeating the coating and drying operations two to three times.

Boron nitride among the constituents demonstrates excellent lubricity particularly at high temperatures. However, boron nitride as a single constituent is inferior in its adhesion onto the outer peripheral surface of the preform in a manufacturing method which will be described later, and, hence, in its adhesion onto the surface of the partially convex spherical portion of the seal in the compression process. Consequently, boron nitride as a single constituent has a drawback in that it is easily exfoliated from the surface.

In the present invention, it was found that by compounding alumina and/or silica with boron nitride at a fixed ratio, the aforementioned drawback of boron nitride as a single constituent can be avoided, that its adhesion onto the outer peripheral surface of the preform and, hence, its adhesion onto the partially convex spherical portion of the seal in the compression process can be improved substantially, that the retention of the lubricating sliding layer, formed by the lubricating composition, on the surface of the partially convex spherical portion of the seal can be enhanced, and that the wear resistance of boron nitride can be enhanced.

It was confirmed that the proportion in which alumina and/or silica is compounded with respect to boron nitride is determined from the viewpoint of improving adhesion and wear resistance without impairing the lubricity of boron nitride, and that a range of 10 to 30 wt. % is therefore preferable.

In the aforementioned lubricating composition in which the lubricating composition containing 70 to 90 wt. % of boron nitride and 10 to 30 wt. % of alumina and/or silica is set as 100 parts by weight, and which contains polytetrafluoroethylene at a fixed ratio, polytetrafluoroethylene itself has a low frictional property, and as it is compounded with the lubricating composition formed of boron nitride and alumina and/or silica, polytetrafluoroethylene exhibits the action of improving a low frictional property of the lubricating composition, the action of enhancing the ductility of the lubricating composition during compression forming, and the action of improving the adhesion of the lubricating composition.

The proportion in which polytetrafluoroethylene is compounded with respect to 100 parts by weight of the lubricating composition containing 70 to 90 wt. % of boron nitride and 10 to 30 wt. % of alumina and/or silica is 200 parts by weight or less, preferably in the range of 50 to 150 parts by weight.

If the compounding proportion of polytetrafluoroethylene exceeds 200 parts by weight, the proportion of the resin in the lubricating composition becomes too large, with the result that the lubricity of boron nitride, among the components, at high temperatures is impaired. If the compounding proportion of polytetrafluoroethylene is in the range of 50 to 150 parts by weight, the aforementioned actions can be demonstrated most satisfactorily without impairing the lubricity of boron nitride at high temperatures.

Graphite may be further compounded, in the proportion of 5 to 15 wt. %, in the lubricating composition including the above-described components for the purpose of improving the wear resistance of the lubricating sliding layer.

Boron nitride, alumina and/or silica as well as polytetrafluoroethylene for forming the above-described aqueous dispersion are preferably in the form of as fine powders as possible, and fine powders having average particle sizes of 10 μm or less, preferably 1 μm or less, more preferably 0.5 μm or less, are used.

Next, a description will be given of a method of manufacturing a spherical annular seal formed of the above-described constituent materials.

(First Method)

Figure 4:
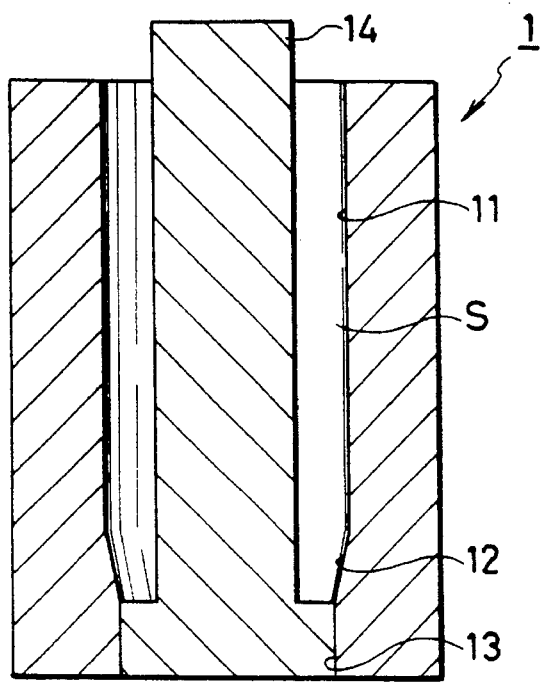
FIG. 4 is a vertical cross-sectional view of a die for fabricating a preform.

As shown in FIG. 4, a die 1 is prepared which has an inner cylindrical wall surface 11, a truncated conical inner wall surface 12, and a through hole 13 continuing from the truncated conical inner wall surface 12, a generally cylindrical hollow portion S being formed therein as a stepped core 14 is fitted in the through hole 13.

A tubular woven metal mesh having mesh openings of 3 to 6 mm is fabricated by using fine metal wires having a diameter of 0.10 to 0.32 mm. This tubular woven metal mesh is passed between pressure rollers so as to be formed into a sheet, and is then wound around an outer peripheral surface of the stepped core 14 by one turn, and an overlapping portion is secured by means of spot welding, thereby forming a tubular reinforcing member 2. The tubular reinforcing member 2 is fitted over the outer peripheral surface of the stepped core 14 and is held in the generally cylindrical hollow portion S of the die 1.

Figure 5:
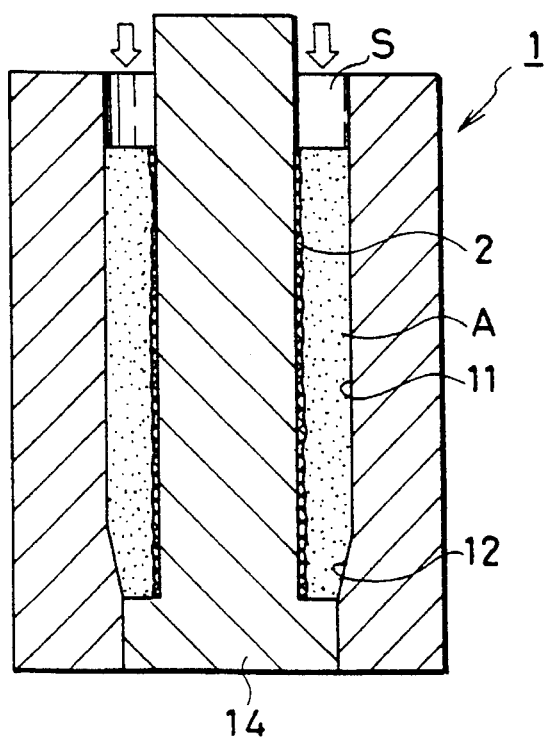
FIG. 5 is a vertical cross-sectional view illustrating a state in which the preform is fabricated.
Figure 6:
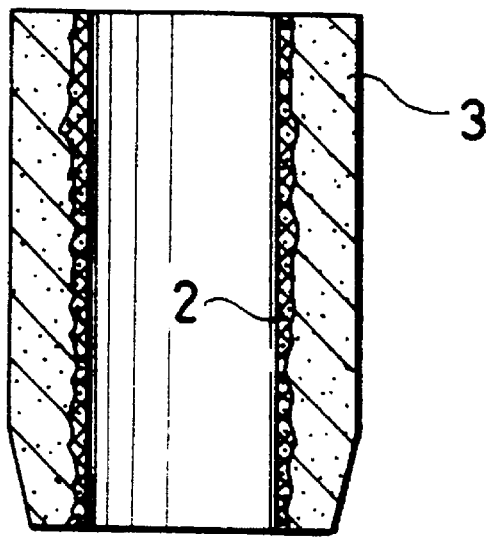
FIG. 6 is a vertical cross-sectional view of the preform.

A mixture including metal short fibers, a solid lubricant, and a synthetic resin binder is filled in the cylindrical hollow portion S of the die 1 in such a manner as to cover the tubular reinforcing member 2 held and fitted over the outer peripheral surface of the stepped core 14, as shown in FIG. 5. The mixture and the reinforcing member are subjected to compression forming under a pressure of 0.1 to 0.8 ton/cm$^2$ in the axial direction of the core, thereby forming a cylindrical preform 3 having the tubular reinforcing member 2 integrated with the mixture A on its inner surface, as shown in FIG. 6.

Figure 7:
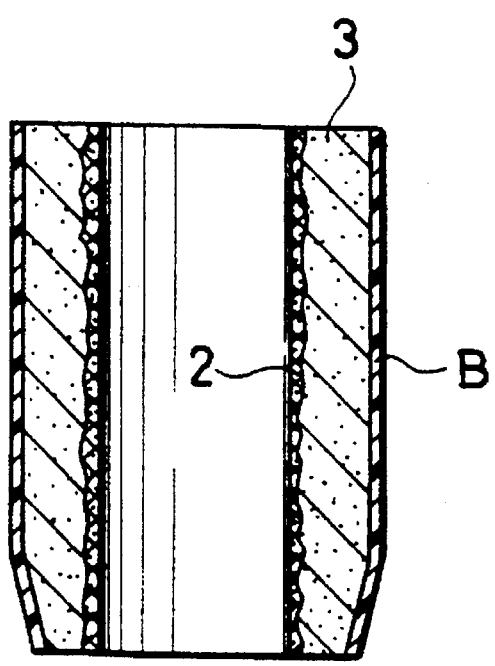
FIG. 7 is a vertical cross-sectional view of the preform coated with a lubricating composition.

An aqueous dispersion containing as a solid content 20 to 50 wt. % of a lubricating composition containing 70 to 90 wt. % of boron nitride and 10 to 30 wt. % of alumina and/or silica, or an aqueous dispersion containing as a solid content 20 to 50 wt. % of a lubricating composition in which a lubricating composition containing 70 to 90 wt. % of boron nitride and 10 to 30 wt. % of alumina and/or silica is set as 100 parts by weight, and which additionally contains polytetrafluoroethylene in the proportion of 200 parts by weight or less, preferably 50 to 150 parts by weight, is coated on an outer peripheral surface of the preform 3, and is then dried. Thus, a coating layer B consisting of the lubricating composition is formed on the outer peripheral surface of the preform 3, as shown in FIG. 7.

Figure 8:
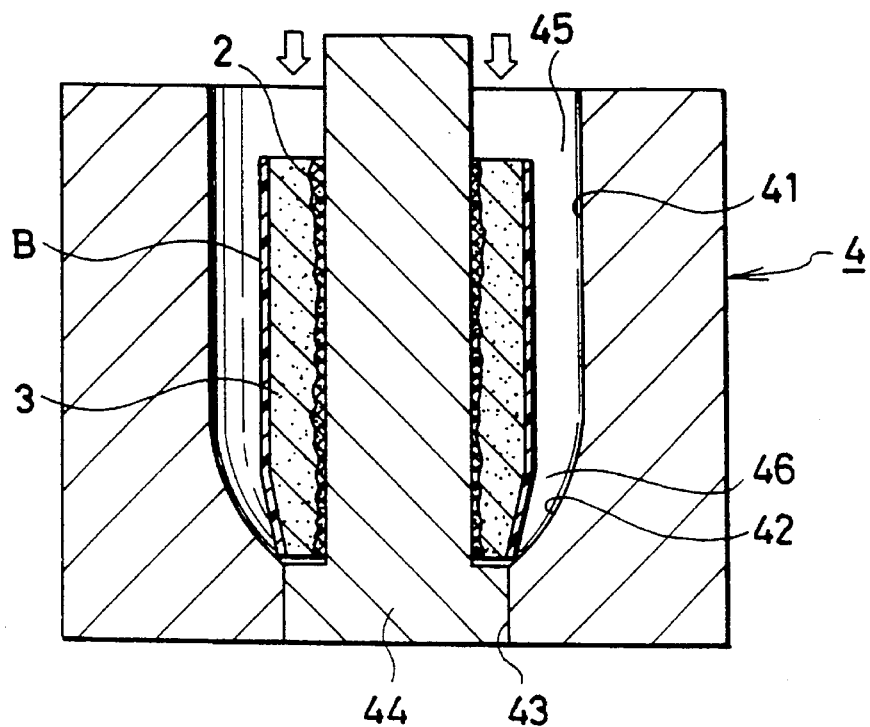
FIG. 8 is a vertical cross-sectional view illustrating a state in which a spherical annular member is fabricated.

As shown in FIG. 8, a die 4 is prepared which has a cylindrical inner wall surface 41, a partially concave spherical inner wall surface 42 continuing from the cylindrical inner wall surface 41, and a through hole 43 continuing from the partially concave spherical inner wall surface 42, and in which a hollow cylindrical portion 45 and a spherical annular hollow portion 46 continuing from the hollow cylindrical portion 45 are formed inside it as a stepped core 44 is inserted in the through hole 43.

Figure 9:
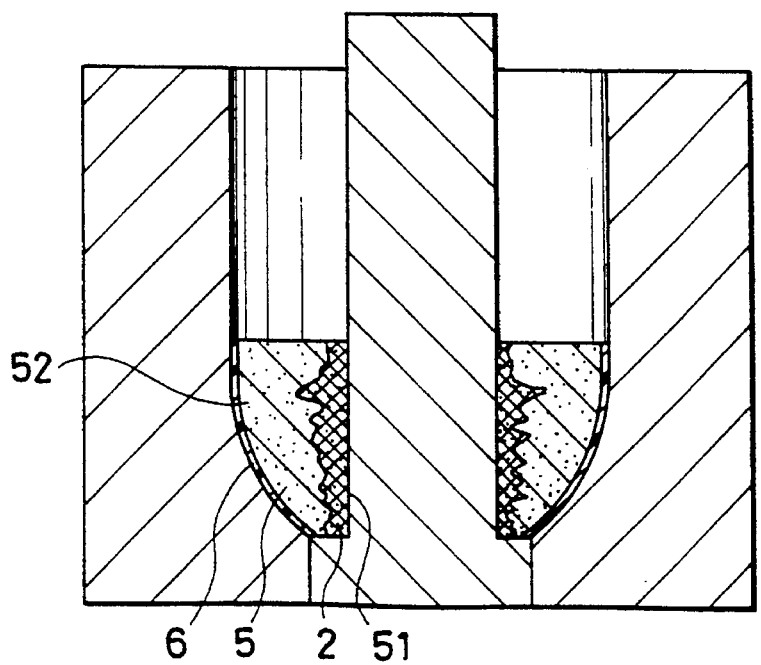
FIG. 9 is a vertical cross-sectional view of the spherical annular member.

The preform 3 with the coating layer B of the lubricating composition formed on its outer peripheral surface is fitted over the stepped core 44 of the die 4, and is subjected to compression forming under a pressure of 1 to 3 tons/cm$^2$ in the direction of the core axis. Thus, a spherical annular member 5 is formed which has in its center a through hole 51 with its inner peripheral surface reinforced by the compressed reinforcing member 2, and in which a sliding layer 6 constituted by the lubricating composition is formed on its outer partially convex spherical surface portion 52, as shown in FIG. 9.

By means of this compression forming, the coating layer B constituted by the lubricating composition formed on the outer peripheral surface of the preform 3 is spread, and is formed on the outer partially convex spherical surface portion 52 as the lubricating sliding layer 6 having a very small thickness (10 to 300 μm).

The spherical annular member 5 thus obtained is placed in a heating furnace, which is heated to a predetermined temperature, for a predetermined time so as to heat and cure the synthetic resin binder in the mixture constituting the member 5, thereby obtaining a final spherical annular seal 7.

As shown in FIG. 1, the final spherical annular seal 7 has in its center a through hole 71 with its inner peripheral surface reinforced by the reinforcing member 2 constituted by the metal mesh as well as a partially convex spherical surface portion 72 on its outer surface, the lubricating sliding layer 6 being formed on the surface of the partially convex spherical surface portion 72.

(Second Method)

By using a method similar to the above-described first method, the preform 3 having the tubular reinforcing member 2 integrated with the mixture A on its inner peripheral surface is formed, as shown in FIG. 6. Further, by using a method similar to that of the above-described first method, the coating layer B constituted by the lubricating composition is formed on the outer peripheral surface of the preform 3, as shown in FIG. 7.

Figure 10:
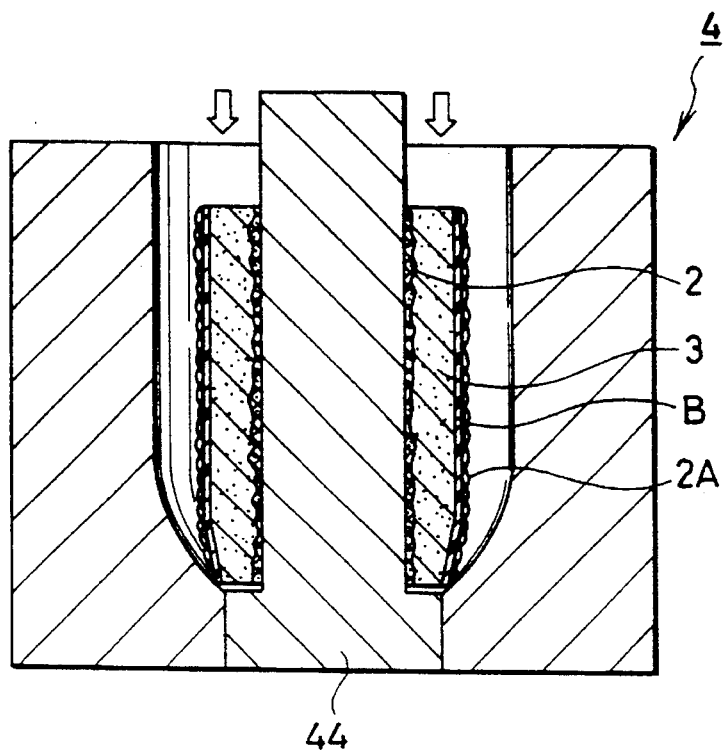
FIG. 10 is a vertical cross-sectional view illustrating a state in which another example of the spherical annular member is fabricated.
Figure 11:
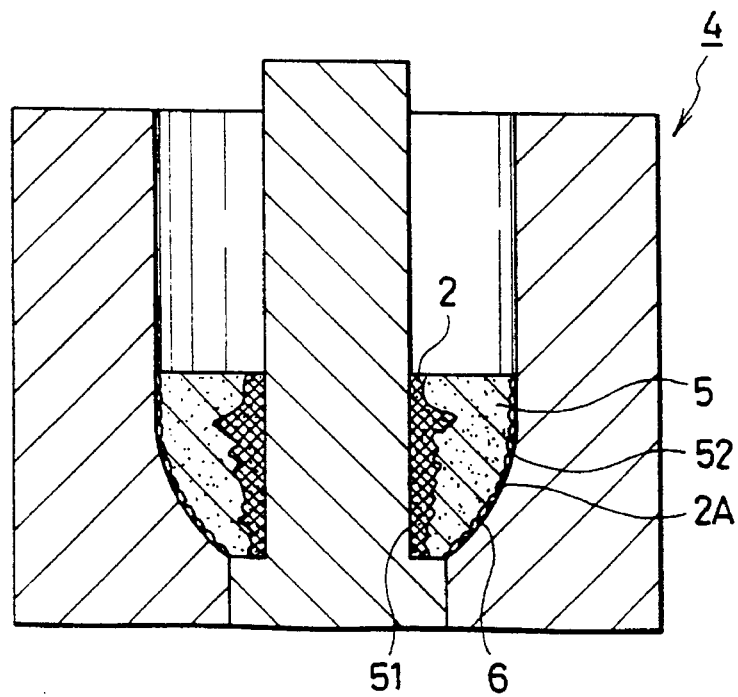
FIG. 11 is a vertical cross-sectional view of the other example of the spherical annular member.

A tubular reinforcing member 2A formed by weaving fine metal wires is prepared, and the preform 3 having the coating layer B is provided with the tubular reinforcing member 2A on its outer peripheral surface in such a manner as to cover the coating layer B. As shown in FIG. 10, the die 4 similar to the one used in the above-described first method is prepared, and the preform 3 provided with the reinforcing member 2A on its outer peripheral surface in such a manner as to cover the coating layer B is fitted over the stepped core 44 of the die 4. The preform 3 and the reinforcing member 2A are subjected to compression forming under a pressure of 1 to 3 ton/cm² in the direction of the core axis. Thus, the spherical annular member 5 is formed which has in its center the through hole 51 with its inner peripheral surface reinforced by the compressed reinforcing member 2, and which has the outer partially convex spherical surface portion 52 covered with a smooth surface in which the lubricating sliding layer 6 constituted by the lubricating composition and the reinforcing member 2A are integrated in mixed form, as shown in FIG. 11.

By means of this compression forming, the coating layer B constituted by the lubricating composition formed on the outer peripheral surface of the preform 3 is spread, and is formed on the outer partially convex spherical surface portion 52 as the lubricating sliding layer 6 having a very small thickness. At the same time, the lubricating sliding layer 6 is integrated with the reinforcing member 2A as the reinforcing member 2A compressed in conformity with the partially concave spherical inner wall surface 42 of the die 4 bites into the lubricating sliding layer 6.

The spherical annular member 5 thus obtained is placed in a heating furnace, which is heated to a predetermined temperature, for a predetermined time so as to heat and cure the synthetic resin binder in the mixture constituting the member 5, thereby obtaining a final spherical annular seal 7A.

Figure 2:
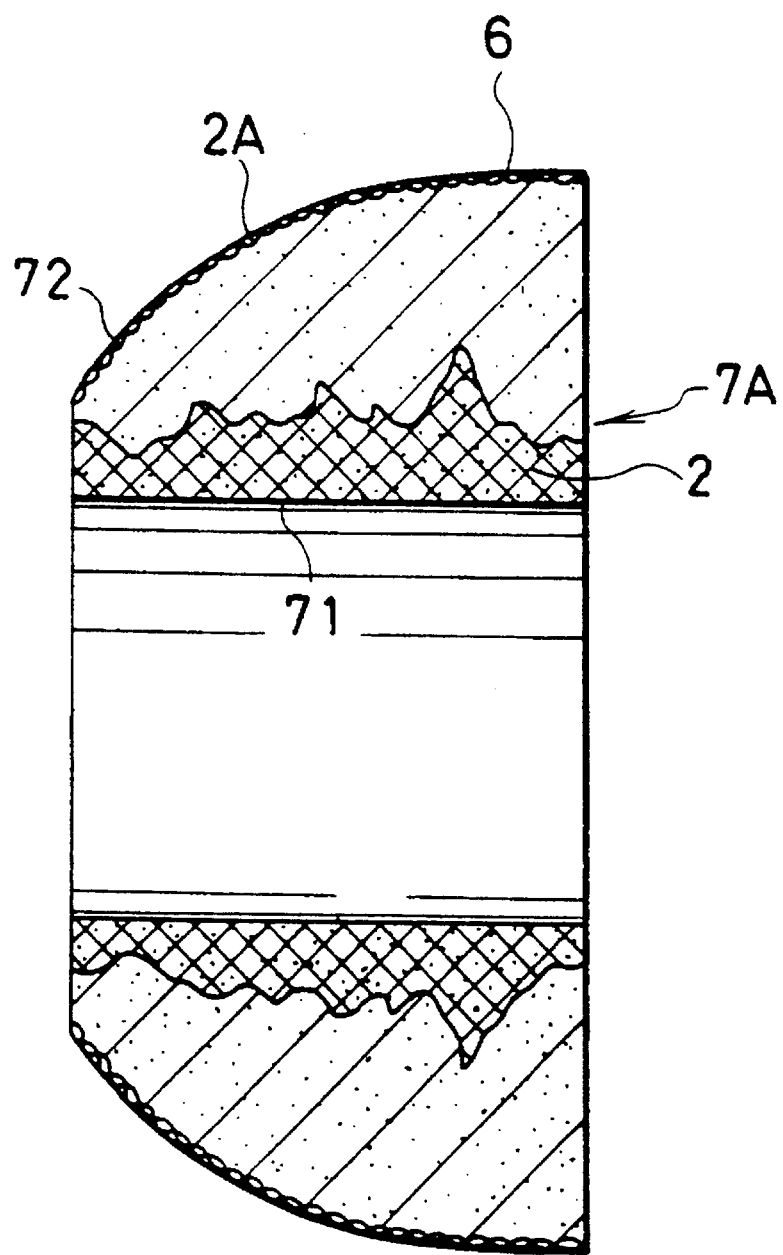
FIG. 2 is a vertical cross-sectional view of another example of a spherical annular seal in accordance with the present invention.

As shown in FIG. 2, the final spherical annular seal 7A has in its center the through hole 71 with its inner peripheral surface reinforced by the reinforcing member 2 formed of the metal mesh as well as the partially convex spherical surface portion 72 on its outer surface, the surface of the partially convex spherical surface portion 72 being formed into a smooth surface in which the lubricating sliding layer 6 and the reinforcing member 2A are integrated in mixed form.

(Third Method)

A mixture of the solid lubricant, the metal short fibers, and the synthetic resin binder is filled in the cylindrical hollow portion S of the die 1, such as the one shown in FIG. 4. The mixture is subjected to compression forming in the direction of the core axis, thereby forming a preform 3A.

An aqueous dispersion containing as a solid content 20 to 50 wt. % of a lubricating composition containing 70 to 90 wt. % of boron nitride and 10 to 30 wt. % of alumina and/or silica, or an aqueous dispersion containing as a solid content 20 to 50 wt. % of a lubricating composition in which a lubricating composition containing 70 to 90 wt. % of boron nitride and 10 to 30 wt. % of alumina and/or silica is set as 100 parts by weight, and which additionally contains polytetrafluoroethylene in the proportion of 200 parts by weight or less, preferably 50 to 150 parts by weight, is coated on an outer peripheral surface of the preform 3A, and is then dried. Thus, the coating layer B consisting of the lubricating composition is formed on the outer peripheral surface of the preform 3A.

Figure 12:
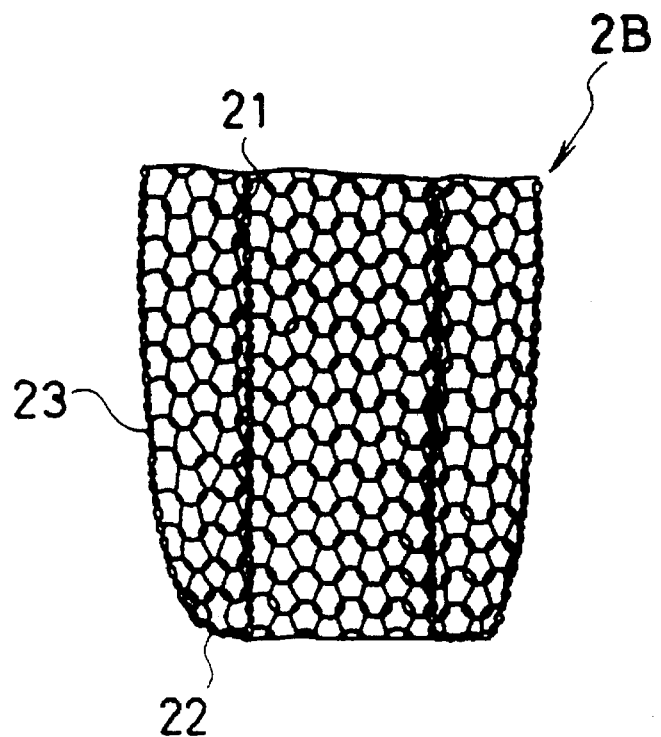
FIG. 12 is a vertical cross-sectional view of a reinforcing member.
Figure 13:
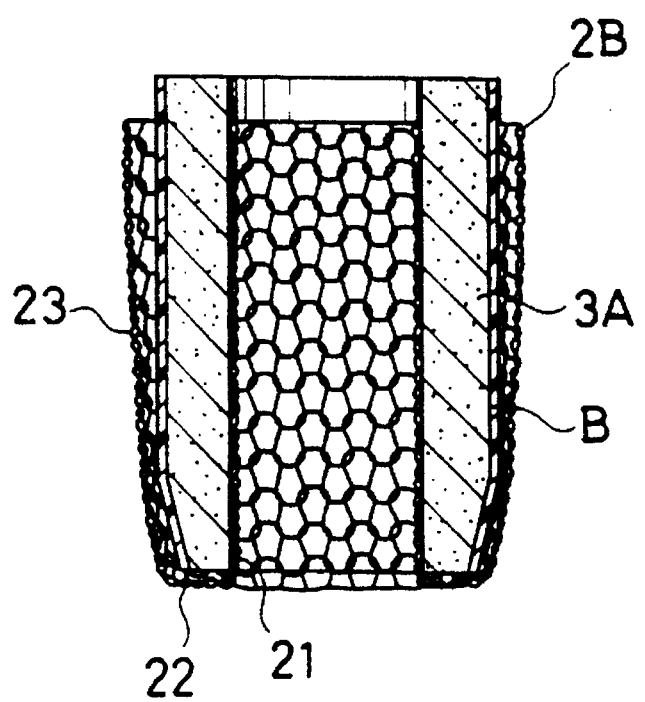
FIG. 13 is a vertical cross-sectional view of an assembly of the reinforcing member and the preform.

A reinforcing member 2B, which is shown in FIG. 12 and is formed of a metal mesh having an inner tubular portion 21, a curved portion 22 continuing from the inner tubular portion 21, and an outer tubular portion 23 continuing from the curved portion, is prepared. The preform 3A on which the coating layer B constituted by the lubricating composition is formed is inserted between the inner and outer tubular portions 21 and 23 of the reinforcing member 2B, as shown in FIG. 13. The die 4 similar to the one used in the above-described first method is prepared. This assembly of the preform 3A and reinforcing member 2B is fitted over the outer peripheral surface of the stepped core 44 of the die 4 so as to be located in the spherical annular hollow portion 46.

The assembly is subjected to compression forming in the direction of the core axis. Thus, a spherical annular member is formed which has in its center a through hole with its inner peripheral surface reinforced by the compressing of the inner portion 21 of the reinforcing member 2B, and which has a partially convex spherical surface portion on its outer surface. The surface of the partially convex spherical surface portion is formed into such a smooth surface that the lubricating sliding layer constituted by the lubricating composition and the reinforcing member 2B extending from the through hole and covering a small-diameter end of the partially convex spherical surface portion as well as the lubricating sliding layer on the partially convex spherical surface portion are integrated in mixed form. By means of this compression forming, the coating layer B constituted by the lubricating composition formed on the outer peripheral surface of the preform 3 is spread, and is formed on the outer partially convex spherical surface portion as the lubricating sliding layer having a very small thickness. At the same time, the lubricating sliding layer is integrated with the reinforcing member 2B as the outer tubular portion 23 of the reinforcing member 2B compressed in conformity with the partially concave spherical inner wall surface 42 of the die 4 bites into the lubricating sliding layer.

Figure 3:
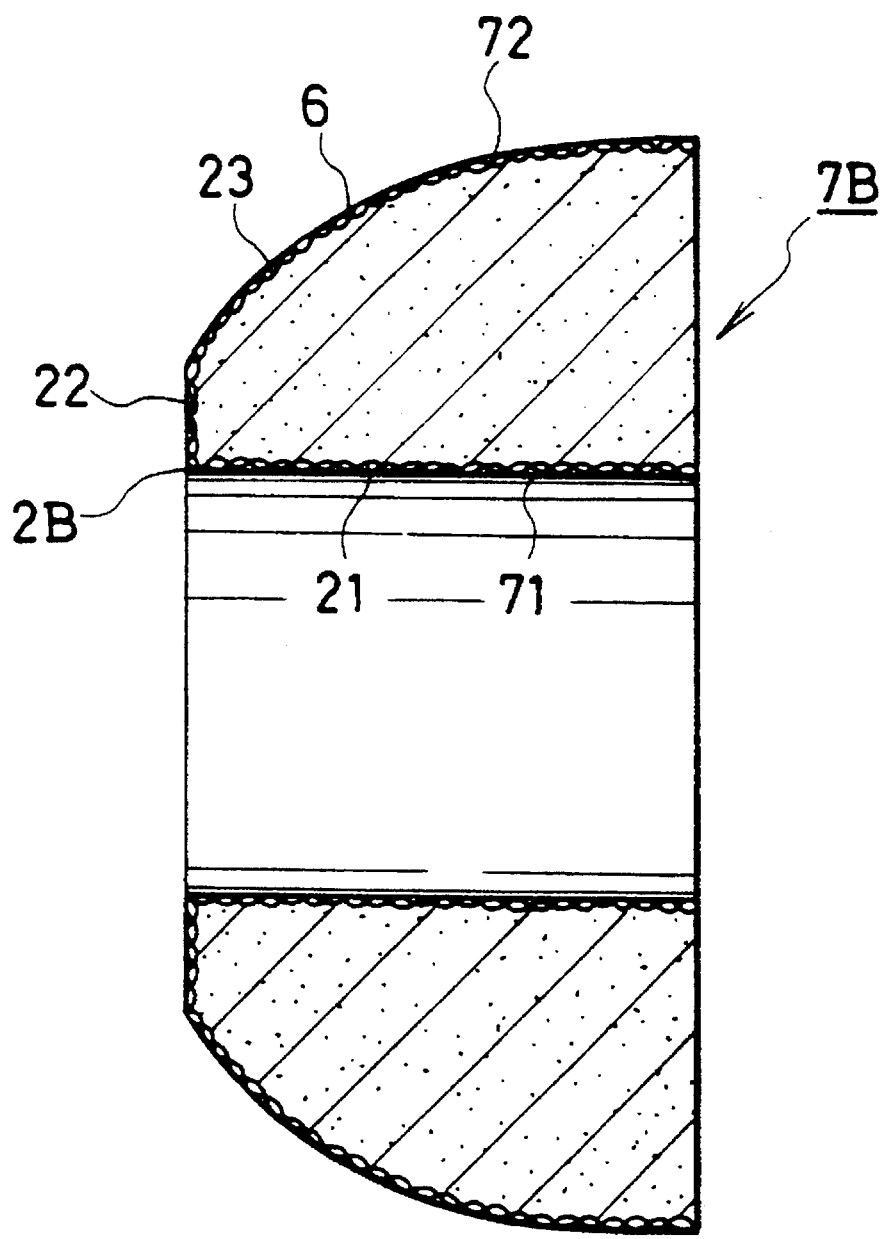
FIG. 3 is a vertical cross-sectional view of a still another example of spherical annular seal in accordance with the present invention.

The spherical annular member thus obtained is placed in a heating furnace, which is heated to a predetermined temperature, for a predetermined time so as to heat and cure the synthetic resin binder in the mixture constituting the form, thereby obtaining a final spherical annular seal 7B. As shown in FIG. 3, the final spherical annular seal 7B has in its center the through hole 71 with its inner peripheral surface reinforced by the inner portion 21 of the reinforcing member 2B constituted by the metal mesh as well as the partially convex spherical surface portion 72 on its outer surface, the surface of the partially convex spherical surface portion 72 being formed into a smooth surface in which the lubricating sliding layer 6 and the outer portion 23 of the reinforcing member 2B are integrated in mixed form. In addition, the small-diameter end of the outer partially convex spherical surface portion of the spherical annular seal 7B is reinforced by the curved portion 22 of the reinforcing member 2B.

Figure 14:
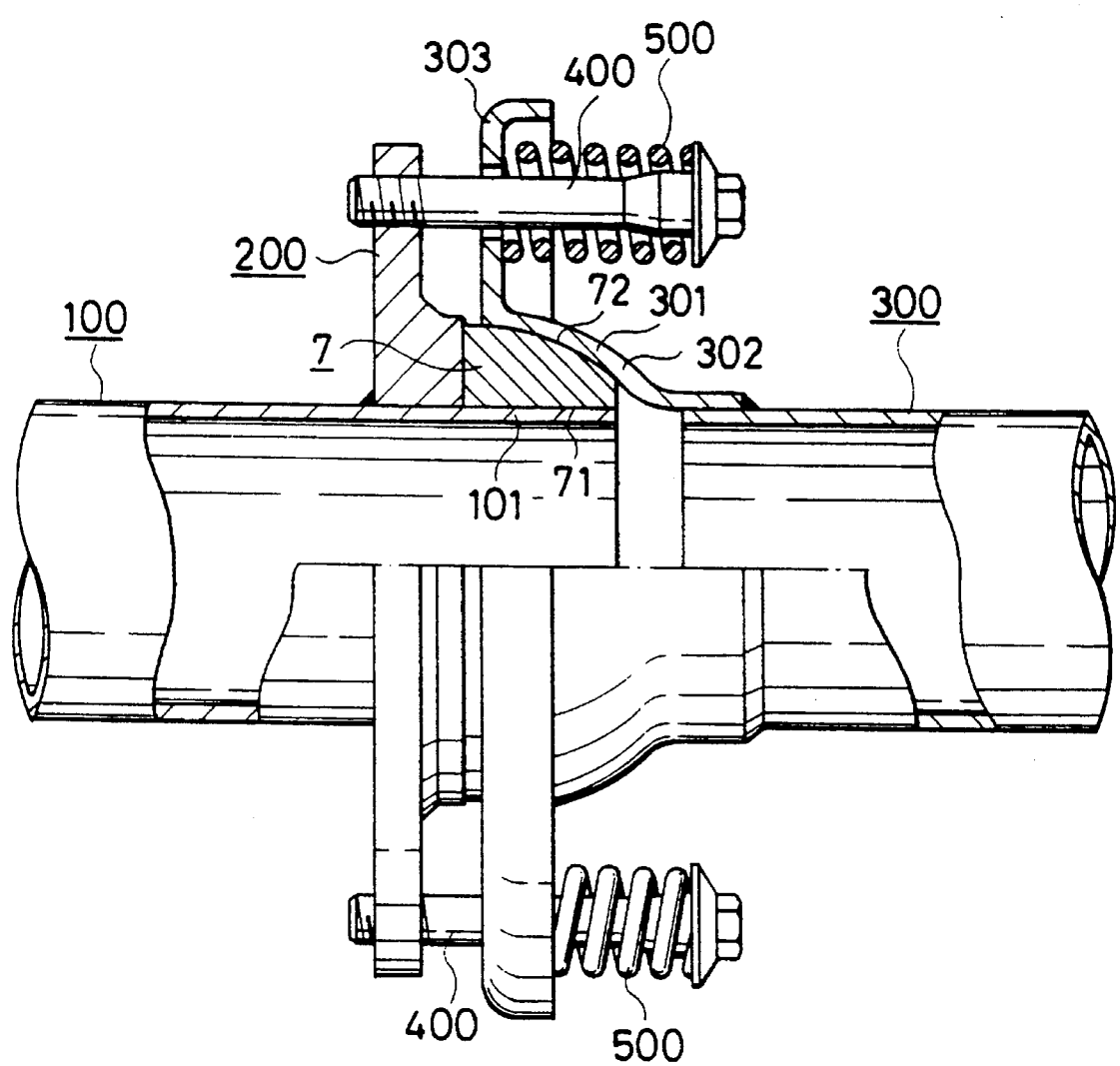
FIG. 14 is a vertical cross-sectional view of an exhaust pipe joint incorporating the spherical annular seal.

Each of the spherical annular seals 7, 7A, and 7B constructed as described above is used by being incorporated in an exhaust pipe joint shown in FIG. 14.

That is, a flange 200 is provided uprightly on an outer peripheral surface of an upstream-side exhaust pipe 100, which is connected to an engine, with a pipe end 101 projecting from the flange 200 in the longitudinal direction of the exhaust pipe 100. The spherical annular seal 7 (7A, 7B) is fitted over the pipe end 101 at the through hole 71, and is seated with a large-diameter-side end face of the partially convex spherical surface portion 72 abutting against that flange 200.

A downstream-side exhaust pipe 300 opposes at one end the upstream-side exhaust pipe 100 and is connected at the other end to a muffler. A flared portion 301, which is comprised of a concave spherical surface portion 302 and a flange portion 303 provided at a rim of an opening portion of the concave spherical surface portion 302, is formed integrally at one end of the downstream-side exhaust pipe 300. The exhaust pipe 300 is disposed with the concave spherical surface portion 302 slidingly abutting against the partially convex spherical surface portion 72 of the spherical annular seal 7.

The downstream-side exhaust pipe 300 is connected to the upstream-side exhaust pipe 100 in such a manner as to be constantly urged toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between a head of the bolt 400 and the flange portion 303.

The arrangement provided is such that relative angular displacements occurring in the upstream- and downstream-side exhaust pipes 100 and 300 are allowed by sliding contact between the partially convex spherical surface portion 72 of the spherical annular seal 7 and the concave spherical surface portion 302 of the flared portion 301 formed at the end of the downstream-side exhaust pipe 300.

Hereafter, a detailed description will be given of examples of the spherical annular seal in accordance with the present invention.

Example I

By using graphite powder as the solid lubricant, the graphite powder, steel fibers having a diameter of 100 μm and a length of 500 μm, and a phenol resin binder were charged into a mixer and were stirred and mixed, thereby preparing a uniform mixture A of the graphite powder, the steel short fibers, and the phenol resin binder (graphite: 22 wt. %, steel short fibers: 57 wt. %, and the phenol resin binder: 21 wt. %).

By using a stainless steel wire having a diameter of 0.3 mm as the reinforcing member, a tubular woven mesh having mesh openings of 5 mm was fabricated. This tubular woven mesh was passed between pressure rollers into a sheet, and was then convoluted into a tubular shape, and an overlapping portion was secured by means of spot welding, thereby forming the tubular reinforcing member 2.

The aforementioned die 1 was prepared, and the reinforcing member 2 was fitted over the outer peripheral surface of the core 14 so as to be held in the generally cylindrical hollow portion S of the die 1.

Subsequently, the mixture was filled in the cylindrical hollow portion S of the die in such a manner as to cover the reinforcing member 2 held and fitted over the outer peripheral surface of the core 14, and the mixture and the reinforcing member 2 were subjected to compression forming under a pressure of 0.3 ton/cm$^2$ in the direction of the core axis, thereby fabricating a cylindrical preform having on its inner surface a reinforcing member integrated with the mixture.

An aqueous dispersion (its composition: 25.5 wt. % of boron nitride, 4.5 wt. % of alumina, and 70 wt. % of water) containing as a solid content 30 wt. % of a lubricating composition containing 85 wt. % of boron nitride powder with an average particle size of 7 μm and 15 wt. % of alumina powder with an average particle size of 0.6 μm, was prepared and coated on the outer peripheral surface of the preform, and was then dried. This operation of coating and drying was repeated three times to form a coating layer of the lubricating composition on the outer peripheral surface of the preform.

The aforementioned die 4 was prepared, and the preform provided with the coating layer of the lubricating composition on its outer peripheral surface was fitted over the stepped core 44 of the die 4, and was subjected to compression forming under a pressure of 2.5 ton/cm$^2$ in the direction of the core axis. Thus, the spherical annular member was fabricated which had in its center a through hole with its inner peripheral surface reinforced by the compressed reinforcing member, and had on its outer surface the partially convex spherical surface portion, a lubricating sliding layer of the lubricating composition containing 85 wt. % of boron nitride and 15 wt. % of alumina being formed on the surface of the partially convex spherical surface portion.

The spherical annular member thus obtained was preheated for 30 minutes in a heating furnace set at a temperature of 80° C., and was then heated for two hours at a temperature of 180° C. to cure the synthetic resin binder in the mixture constituting the form, thereby obtaining a spherical annular seal.

Example II

By using the same die, tubular reinforcing member, and mixture as those of Example I above, a preform having the reinforcing member integrated with the mixture on its inner surface was fabricated. An aqueous dispersion (17 wt. % of boron nitride, 3 wt. % of alumina, 10 wt. % of polytetrafluoroethylene, and 70 wt. % of water) containing as a solid content 30 wt. % of a lubricating composition (56.7 wt. % of boron nitride, 10 wt. % of alumina, and 33.3 wt. % of polytetrafluoroethylene) in which a lubricating composition containing 85 wt. % of boron nitride powder with an average particle size of 7 μm and 15 wt. % of alumina powder with an average particle size of 0.6 μm was set as 100 parts by weight, and which additionally contained 50 parts by weight of polytetrafluoroethylene powder with an average particle size of 0.3 μm, was prepared. This aqueous dispersion was coated on the outer peripheral surface of the preform, and was then dried. This operation of coating and drying was repeated three times to form the coating layer of the lubricating composition on the outer peripheral surface of the preform.

Thereafter, by using the same method as that of Example 1, a spherical annular seal was obtained which had in its center a through hole with its inner peripheral surface reinforced by the compressed tubular reinforcing member, and had on its outer surface the partially convex spherical surface portion, a lubricating sliding layer of the lubricating composition containing 56.7 wt. % of boron nitride, 10 wt. % of alumina, and 33.3 wt. % of polytetrafluoroethylene being formed on the surface of the partially convex spherical surface portion.

Example III

By using the same mixture as that of the above-described Example I, a preform constituted by the mixture was prepared. An aqueous dispersion similar to that of the above-described Example II was coated on the outer peripheral surface of this preform, and was then dried. This operation of coating and drying was repeated three times to form the coating layer of the lubricating composition on the outer peripheral surface of the preform.

As the reinforcing member, by using a stainless steel wire having a diameter of 0.3 mm, a tubular woven mesh having mesh openings of 5 mm was fabricated. After this tubular woven mesh was cut into a predetermined length, one end of the mesh was turned back toward the other end, thereby forming a reinforcing member comprised of an inner tubular portion, a turned-back curved portion continuing from the inner tubular portion, and an outer tubular portion continuing from the curved portion. The preform having the coating layer of the aforementioned lubricating composition was inserted between the inner and outer tubular portions of this reinforcing member, thereby fabricating an assembly of the reinforcing member and the preform.

Subsequently, a die similar to that used in Example I was prepared, and the assembly of the reinforcing member and the preform was fitted over the outer peripheral surface of the stepped core of the die, was located in the spherical annular hollow portion of the die, and was subjected to compression forming in the direction of the core axis. Thus, a spherical annular member was formed which had in its center a through hole with its inner peripheral surface reinforced by the compressing of the inner tubular portion of the reinforcing member, and which had a partially convex spherical surface portion on its outer surface. The surface of the partially convex spherical surface portion was formed into such a smooth surface that the lubricating sliding layer constituted by the lubricating composition and the reinforcing member 2B extending from the through hole and covering a small-diameter end of the partially convex spherical surface portion as well as the lubricating sliding layer on the partially convex spherical surface portion were integrated in mixed form.

The spherical annular member thus obtained was preheated for 30 minutes in a heating furnace set at a temperature of 80° C., and was then heated for two hours at a temperature of 180° C. to cure the synthetic resin binder in the mixture constituting the form, thereby obtaining a spherical annular seal.

Comparative Example

A cylindrical preform having a tubular reinforcing member integrated with the mixture A on its inner surface was fabricated by a method similar to that of the above-described Example I.

An aqueous dispersion (15 wt. % of polytetrafluoroethylene, 6 wt. % of graphite, 6 wt. % of tungsten disulfide, 3 wt. % of calcium fluoride, and 70 wt. % of water) containing as a solid content 30 wt. % of a lubricating composition including 50 wt. % of polytetrafluoroethylene powder with an average particle size of 0.3 μm, 20 wt. % of graphite powder, 20 wt. % of tungsten disulfide powder, and 10 wt. % of calcium fluoride powder, was prepared. This aqueous dispersion was coated on the outer peripheral surface of the preform, and was dried, thereby forming a coating layer of the lubricating composition on the outer surface of the preform.

Thereafter, in a method similar to that of Example I, a spherical annular seal was obtained which had in its center a through hole with its inner peripheral surface reinforced by the compressed reinforcing member, and had on its outer surface the partially convex spherical surface portion, a lubricating sliding layer of the lubricating composition containing 50 wt. % of polytetrafluoroethylene, 20 wt. % of graphite, 20 wt. % of tungsten disulfide, and 10 wt. % of calcium fluoride being formed on the surface of the partially convex spherical surface portion.

Then, with respect to the spherical annular seals in accordance with the above-described Examples and Comparative Example, tests were conducted for measurement of a frictional torque (kgf. cm) during an initial period of friction of the seals and for checking the presence or absence of the occurrence of abnormal noise by using the exhaust pipe joint shown in FIG. 14, and its results are discussed below.

(Test I)

Test Conditions:

Pressing force using coil springs: 60 kgf

Angle of oscillation: ±3°

Frequency: 10 hertz

Ambient temperature (temperature of the outer surface temperature of the concave spherical surface portion 302 shown in FIG. 14): from room temperature (20° C.) to 500° C.

Test Method: An oscillating motion at ±3° at a frequency of 10 hertz is set as a unit of oscillation, and is performed 45,000 times at room temperature. The ambient temperature is then raised to 500° C. while continuing the oscillating motion (the number of oscillating motions during the temperature rise being 45,000). When the ambient temperature reaches 500° C., the oscillating motion is performed 115,000 times. Finally, the temperature is allowed to drop to room temperature while continuing the oscillating motion (the number of oscillating motions during the temperature drop being 45,000). The total number of oscillating motions of 250,000 is set as one cycle, and four cycles are performed.

(Test II)

Test Conditions:

Pressing force using coil springs: 72 kgf

Angle of oscillation: ±3°, ±2° (two directions that are perpendicular to each other; in FIG. 14, a direction perpendicular to the axes of the bolts is set as an X-direction, while a direction perpendicular to the X-direction is set as a Y-direction)

Frequency: 1.6 hertz, 12 hertz (X-direction), 7.2 hertz (Y-direction)

Ambient temperature (temperature of the outer surface temperature of the concave spherical surface portion 302 shown in FIG. 14): from room temperature (20° C.) to 500° C.

Test Method: An oscillating motion at ±3° in the X-direction is set as a unit of oscillation, and the oscillating motion at a frequency of 1.6 hertz is performed 1000 times at room temperature. The ambient temperature is then raised to 500° C. while continuing the oscillating motion (the number of oscillating motions during the temperature rise being 5000). When the ambient temperature reaches 500° C., the oscillating motion in the X-direction is increased to 12 hertz, and is performed 44,000 times. Also, with respect to the Y-direction perpendicular to the X-direction, an oscillating motion at a frequency of 7.2 hertz and ±2° is set as a unit of oscillation, and the oscillating motion is performed 26,400 times. Subsequently, the oscillating conditions only with respect to the X-direction are changed to the oscillating motion at 1.6 hertz and ±3°, the oscillating motion in the Y-direction is stopped, and the temperature is allowed to drop to room temperature (the number of oscillating motions during the temperature drop being 500). The total number of oscillating motions of 55,000 in the X-direction and the total number of oscillating motions of 26,400 in the Y-direction are set as one cycle, and four cycles are performed.

In addition, the evaluation of the presence or absence of the occurrence of abnormal noise is conducted as follows.

Evaluation Code I: No abnormal noise occurred.

Evaluation Code II: Abnormal noise is heard slightly with the ear brought close to the test piece.

Evaluation Code III: Although the noise is generally difficult to discern at a fixed position (a position 1.5 m distant from the test piece) since it is blanketed by the noises of the living environment, the noise can be discerned as abnormal noise by a person in charge of the test.

Evaluation Code IV: The noise can be recognized as abnormal noise (unpleasant sound) by anybody at the fixed position.

Table 1 shows the results of the above-described Test I.

TABLE 1

|   |   | Example I | Example II | Example III | Comparative Example |
|---|---|---|---|---|---|
| 1 | Frictional torque | 70–100 | 60–80 | 60–80 | 60–90 |
|   | Abnormal noise | I | I | I | I |
| 2 | Frictional torque | 100–120 | 90–100 | 90–100 | 90–100 |
|   | Abnormal noise | I | I | I | I |
| 3 | Frictional torque | 110–130 | 100–110 | 100–110 | 100–130 |
|   | Abnormal noise | I | I | I | I |
| 4 | Frictional torque | 110–130 | 100–120 | 100–120 | 100–130 |
|   | Abnormal noise | I | I | I | I |

In Table 1, item 1 represents the results with the number of oscillating motions of 0 to 250,000; item 2 represents the results with the number of oscillating motions of 250,000 to 500,000; item 3 represents the results with the number of oscillating motions of 500,000 to 750,000; and item 4 represents the results with the number of oscillating motions of 750,000 to 1,000,000.

From these test results, no difference in performance is recognized between the Examples and the Comparative Example, the frictional torque is low in both cases, and no occurrence of abnormal noise is recognized. Table 2 shows results of the above-described Test II.

TABLE 2

|   |   | Example I | Example II | Example III | Comparative Example |
|---|---|---|---|---|---|
| 1 | Frictional torque | 70–100 | 60–80 | 60–80 | 60–90 |
|   | Abnormal noise | I | I | I | II |
| 2 | Frictional torque | 70–120 | 50–100 | 50–100 | 50–100 |
|   | Abnormal noise | II | II | I | IV |
| 3 | Frictional torque | 100–120 | 50–100 | 50–100 | 80–130 |
|   | Abnormal noise | I | I | I | I |
| 4 | Frictional torque | 100–120 | 50–100 | 50–100 | 80–130 |
|   | Abnormal noise | I | I | I | I |

In Table 2, item 1 shows the results with the number of oscillating motions of 0 to 55,000 in the X-direction (the number of oscillating motions in the Y-direction being 26,400); item 2 represents the results with the number of oscillating motions of 55,000 to 110,000 (the number of oscillating motions in the Y-direction being 52,800); item 3 represents the results with the number of oscillating motions of 110,000 to 165,000 (the number of oscillating motions in the Y-direction being 79,200); and item 4 represents the results with the number of oscillating motions of 165,000 to 220,000 (the number of oscillating motions in the Y-direction being 105,600).

From the test results, stable performance is noted for the spherical annular seal in accordance with the Example throughout the test period without occurrence of abnormal noise.

Meanwhile, in the case of the spherical annular seal of the Comparative Example, the occurrence of slight abnormal noise is recognized up to the number of oscillating motions of 55,000 in the X-direction (the number of oscillating motions in the Y-direction being 26,400). Furthermore, the occurrence of unpleasant abnormal noise is recognized in the range of the number of oscillating motions of 55,000 to 110,000 (the number of oscillating motions in the Y-direction being 52,800). However, the occurrence of abnormal noise is not recognized at a level exceeding the number of oscillating motions of 110,000.

The occurrence of unpleasant abnormal noise in the range of the number of oscillating motions of 55,000 to 110,000 is presumably recognized in a state in which the lubricating sliding layer of the lubricating composition formed on the surface has exfoliated, and the friction with a mating member has shifted to friction with the mixture on the partially convex spherical surface portion on which the lubricating sliding layer is formed.

Then, due to the subsequent friction, a coating of the solid lubricant (graphite) in the mixture is formed on the surface of the mating member, and the friction shifted to friction with that coating, with the result that the occurrence of unpleasant noise (abnormal noise) ceased.

From the above-described Tests I and II, it can be appreciated that the seal in accordance with the Example exhibits stable performance without occurrence of abnormal noise irrespective of the conditions in which the seal is used.

Although examples in which alumina is used have been shown in the above-described embodiment, silica may be used instead of alumina, or both alumina and silica may be used, in which cases it is possible to obtain advantages similar to those obtained in the examples.

What is claimed is:

1. A method of manufacturing a spherical annular seal, comprising the steps of:
   (1) fitting a tubular reinforcing member formed of a metal mesh over an outer peripheral surface of a core of a die having a generally cylindrical hollow portion in its interior;
   (2) forming a preform having said reinforcing member integral in and on its inner surface by filling a mixture of a solid lubricant, metal short fibers, and a synthetic resin binder in the hollow portion in such a manner as to fill in mesh openings of said reinforcing member and cover said reinforcing member, and by compression forming said mixture and said reinforcing member in a direction of a core axis;
   (3) forming a coating layer constituted by a lubricating composition by coating an outer peripheral surface of said preform with an aqueous dispersion containing as a solid content 20 to 50 wt. % of said lubricating composition containing 70 to 90 wt. % of boron nitride and 10 to 30 wt. % of alumina and/or silica, and by drying said aqueous dispersion;
   (4) preparing a die having a partially concave spherical surface portion on its inner surface, and fitting said preform with said coating layer of said lubricating composition formed thereon over an outer peripheral surface of said core of said die;
   (5) compressing said preform in a direction of a core axis for obtaining a spherical annular member which has in its center a through hole with its inner peripheral surface reinforced by the compressed reinforcing member, as well as a partially convex spherical surface portion on its outer surface, a uniform lubricating sliding layer of said lubricating composition containing 70 to 90 wt. % of boron nitride and 10 to 30 wt. % of alumina and/or silica being formed on a surface of said partially convex spherical surface portion; and
   (6) placing said spherical annular member in a heating furnace to heat and cure said synthetic resin binder in said mixture and heating curing said synthetic resin binder.

2. A method of manufacturing a spherical annular seal, comprising the steps of:
   (1) fitting a tubular reinforcing member formed of a metal mesh over an outer peripheral surface of a core of a die having a generally cylindrical hollow portion in its interior;
   (2) forming a preform having said reinforcing member integral in and on its inner surface by filling a mixture of a solid lubricant, metal short fibers, and a synthetic resin binder in the hollow portion in such a manner as to fill in mesh openings of said reinforcing member and cover said reinforcing member, and by compression forming said mixture and said reinforcing member in a direction of a core axis;
   (3) forming a coating layer constituted by a lubricating composition by coating an outer peripheral surface of said preform with an aqueous dispersion containing as a solid content 20 to 50 wt. % of said lubricating composition containing 70 to 90 wt. % of boron nitride and 10 to 30 wt. % of alumina and/or silica, and by drying said aqueous dispersion;
   (4) preparing a die having a partially concave spherical surface portion on its inner surface, and fitting said preform with said coating layer of said lubricating composition formed thereon over an outer peripheral surface of said core of said die, and fitting a tubular reinforcing member formed of a metal mesh over an outer peripheral surface of said preform;
   (5) compressing said preform and said reinforcing member in a direction of a core axis for obtaining a spherical annular member which has in its center a through hole with its inner peripheral surface reinforced by the compressed reinforcing member, as well as a partially convex spherical surface portion on its outer surface, a surface of said partially convex spherical surface portion being formed into a smooth surface in which a lubricating sliding layer of said lubricating composition containing 70 to 90 wt. % of boron nitride and 10 to 30 wt. % of alumina and/or silica and said reinforcing member formed of said metal mesh covering said lubricating sliding layer and integrated with said lubricating sliding layer are present in mixed form; and
   (6) placing said spherical annular member in a heating furnace to heat and cure said synthetic resin binder in said mixture and heating curing said synthetic resin binder.

3. A method of manufacturing a spherical annular seal, comprising the steps of:
   (1) preparing a die having a generally cylindrical hollow portion in its interior by filling a mixture of a solid lubricant, metal short fibers, and a synthetic resin binder in said hollow portion, and compression forming said mixture in a direction of a core axis so as to form a preform;
   (2) forming a coating layer constituted by a lubricating composition by coating an outer peripheral surface of said preform with an aqueous dispersion containing as a solid content 20 to 50 wt. % of said lubricating composition containing 70 to 90 wt. % of boron nitride and 10 to 30 wt. % of alumina and/or silica, and by drying said aqueous dispersion;
   (3) preparing a reinforcing member formed of a metal mesh having an inner tubular portion, a curved portion continuing from said inner tubular portion, and an outer tubular portion continuing from said curved portion;
   (4) inserting said preform with said coating layer of said lubricating composition formed thereon between said inner and outer tubular portions of said reinforcing member formed of said metal mesh, and fitting an assembly of said preform and said reinforcing member over an outer peripheral surface of a core of a die having a partially concave spherical surface portion on its inner surface so as to be located on said partially concave spherical surface portion of said die;
   (5) compression forming the assembly in a direction of a core axis, for obtaining a spherical annular member which has in its center a through hole with its inner peripheral surface reinforced by the compressed reinforcing member, as well as a partially convex spherical surface portion on its outer surface, a surface of said partially convex spherical surface portion being formed into a smooth surface in which a lubricating sliding layer of said lubricating composition containing 70 to 90 wt. % of boron nitride and 10 to 30 wt. % of alumina and/or silica and said reinforcing member integrated with said lubricating sliding layer in such a manner as to extend from the through hole and cover a small-diameter end of said partially convex spherical surface portion and said lubricating sliding layer on said partially convex spherical surface portion are present in mixed form; and (6) placing said spherical annular member in a heating furnace to heat and cure said synthetic resin binder in said mixture and heating curing said synthetic resin binder.

4. The method of manufacturing a spherical annular seal according to wherein said lubricating composition contains 100 parts by weight of the lubricating composition containing 70 to 90 wt. % of boron nitride and 10 to 30 wt. % of alumina and/or silica, and further contains polytetrafluoroethylene in a proportion of not more than 200 parts by weight.

5. The method of manufacturing a spherical annular seal according to wherein said lubricating composition contains 100 parts by weight of the lubricating composition containing 70 to 90 wt. % of boron nitride and 10 to 30 wt. % of alumina and/or silica, and further contains polytetrafluoroethylene in a proportion ranging from 50 to 150 parts by weight.

6. The method of manufacturing a spherical annular seal according to claim 1 or 3, wherein said mixture includes 15 to 30 wt. % of said solid lubricant, 50 to 75 wt. % of said metal short fibers, and 5 to 25 wt. % of said synthetic resin binder.

7. The method of manufacturing a spherical annular seal according to claim 1 or 3, wherein said metal short fibers have a diameter of 10 to 200 μm and a length of 100 to 800 μm.

8. The method of manufacturing a spherical annular seal according to claim 1 or 3, wherein said reinforcing member formed of said metal mesh is formed of said metal mesh obtained by weaving or knitting fine metal wires.

\* \* \* \* \*

UNITED STATES PATENT AND TRADEMARK OFFICE
CERTIFICATE OF CORRECTION

PATENT NO. : 5,615,479
DATED : April 1, 1997
INVENTOR(S) : MAEDA et al

It is certified that error appears in the above-identified patent and that said letters patent is hereby corrected as shown below:

Column 19, line 40 after "heating" insert --and--.
Column 20, line 21, after "heating" insert --and--.
Column 21, line 3, after "heating" insert --and--.
Column 21, lines 6 and 13, after "according to" insert --any one of claims 1 to 3,--.

Signed and Sealed this

Twenty-first Day of October 1997

Attest:

BRUCE LEHMAN

Attesting Officer

Commissioner of Patents and Trademarks